United States Patent [19]
Hofius, Sr. et al.

[11] Patent Number: 5,772,103
[45] Date of Patent: Jun. 30, 1998

[54] METHOD AND APPARATUS FOR FRICTION TORQUE WELDING

[76] Inventors: David V. Hofius, Sr., 235 Pierce Ave.; Mark W. Hofius, 429 Line St., both of Sharpsville, Pa. 16150

[21] Appl. No.: 719,428

[22] Filed: Sep. 25, 1996

[51] Int. Cl.$^6$ .................................................. B23K 20/12
[52] U.S. Cl. ....................... 228/114.5; 228/102; 156/73.5
[58] Field of Search ............................ 228/2.3, 7, 114.5, 228/114, 102; 156/73.5, 580

[56] References Cited

U.S. PATENT DOCUMENTS

| | | |
|---|---|---|
| 3,542,274 | 11/1970 | Miller . |
| 3,542,275 | 11/1970 | Loyd . |
| 3,562,073 | 2/1971 | Kibler . |
| 3,750,927 | 8/1973 | Miller et al. . |
| 4,466,565 | 8/1984 | Miyazima ................................. 228/1.1 |

*Primary Examiner*—Samuel M. Heinrich
*Attorney, Agent, or Firm*—Harpman & Harpman

[57] ABSTRACT

A friction welding method and apparatus for holding and joining thermo-plastic resin elements together by rotational torque friction. The method includes precise orientation of the joined surfaces together, applying pressure to the elements and precisely controlling a pre-determined rotation of the rotatable element against the fixed element within a fraction of a second achieving welding of the thermo-plastic part. Precise starting and stopping of the rotatable element achieves a rapid superior weld joint between the elements.

8 Claims, 2 Drawing Sheets

METHOD AND APPARATUS FOR FRICTION TORQUE WELDING

BACKGROUND OF THE INVENTION

Technical Field

This device relates to friction welding apparatus that rely on friction between two mechanical components. One of the components develops friction at the interface of the two parts to be joined in order to generate the required temperature for welding. The other component produces pressure after the required temperature is achieved completing the weld. Currently, there are two general methods for friction welding as disclosed by the American Welding Society "Inertia and Continuous drive". Both methods employ high velocity and pressure to achieve the friction required to weld. "Inertia" method stores total energy in a fly wheel that becomes free wheeling at one point in the weld using stored energy to complete the weld. "Continuous Drive" method provides a motor and clutch brake wherein an element is brought up to speed and the clutch is engaged with moderate interface pressure generating heat. A brake is applied once the forging range of material is reached.

Description of Prior Art

Prior art devices of this type have relied on a number of different friction welding techniques utilizing the "Continuous drive" and "Inertia" methods and varieties on same, see for example U.S. Pat. Nos. 3,542,274, 3,542,275, 3,562,073 and 3,750,927.

In U.S. Pat. No. 3,542,274 a speed program friction weld control is disclosed wherein an electronic loop employing circuits to continuously compare critical speed of the drive with the program speed throughout the weld cycle and adjusting same.

U.S. Pat. No. 3,542,275 discloses a reciprocating friction welder that provides means to position and align weld pieces in a reciprocating friction welder.

U.S. Pat. No. 3,562,073 is directed towards friction welding a pair of plastic members in an angular relationship in a spin welding device to weld an elbow fitting to a pump housing.

In U.S. Pat. No. 3,750,927 a device for angular alignment of inertia/friction weld parts wherein weld parts are aligned by turning one part with respect to the other through the hot plasticized interference after the parts have been welded.

U.S. Pat. No. 4,552,609 is directed to a method and application for friction welding having a controlled system that terminates the applied rotational force after determined rotations have been achieved allowing the rotating element to coast, and a final forging pressure is applied.

Applicant's method of the invention uses a pressure alignment of parts to be welded before rotation i.e. welding takes place. Accordingly, it is the applied torque between the parts that achieves welding thereof within a fraction of a second by rapidly accelerating to full speed and de-accelerating to a predetermined stop position before the weld sets, all within several arc seconds.

SUMMARY OF THE INVENTION

A friction welding method and apparatus that achieves a complete weld between a fixed and rotating thermoplastic parts by applying pressure and instantaneous rotation and rotational stop within milliseconds. The method is directed to precisely holding and aligning thermoplastic parts under pressure, rotating the weld part against the fixed part, achieving a superior weld between the parts by holding said welded parts for a predetermined cool time after rotation has stopped and then releasing the completed assembly.

DESCRIPTION OF THE PREFERRED EMBODIMENT

Figure 1:
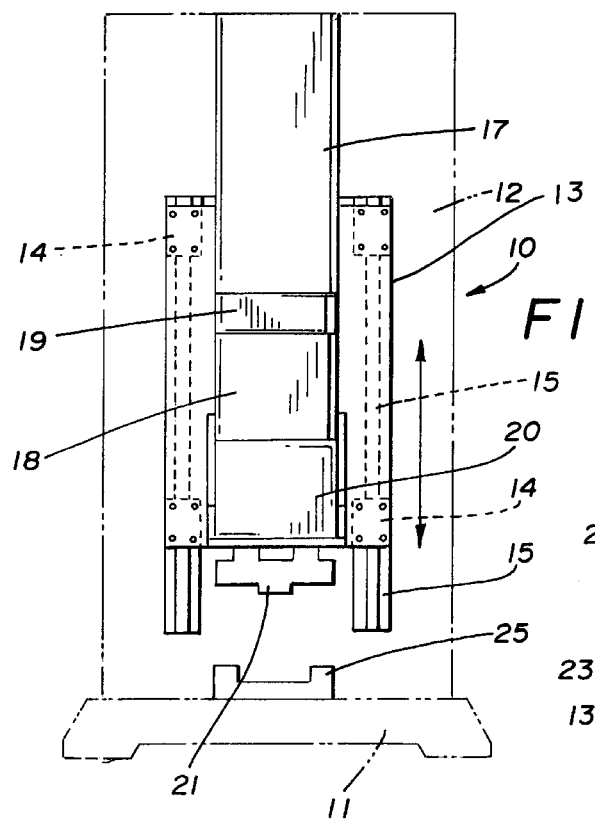
FIG. 1 is an illustrative front elevational view representing a typical welding apparatus of the invention.
Figure 2:
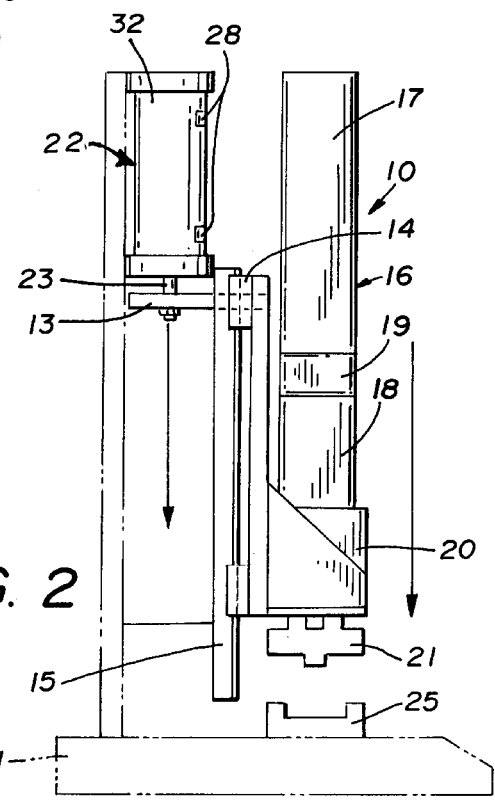
FIG. 2 is an illustrative side elevational view of the welding apparatus of the invention.
Figure 3:
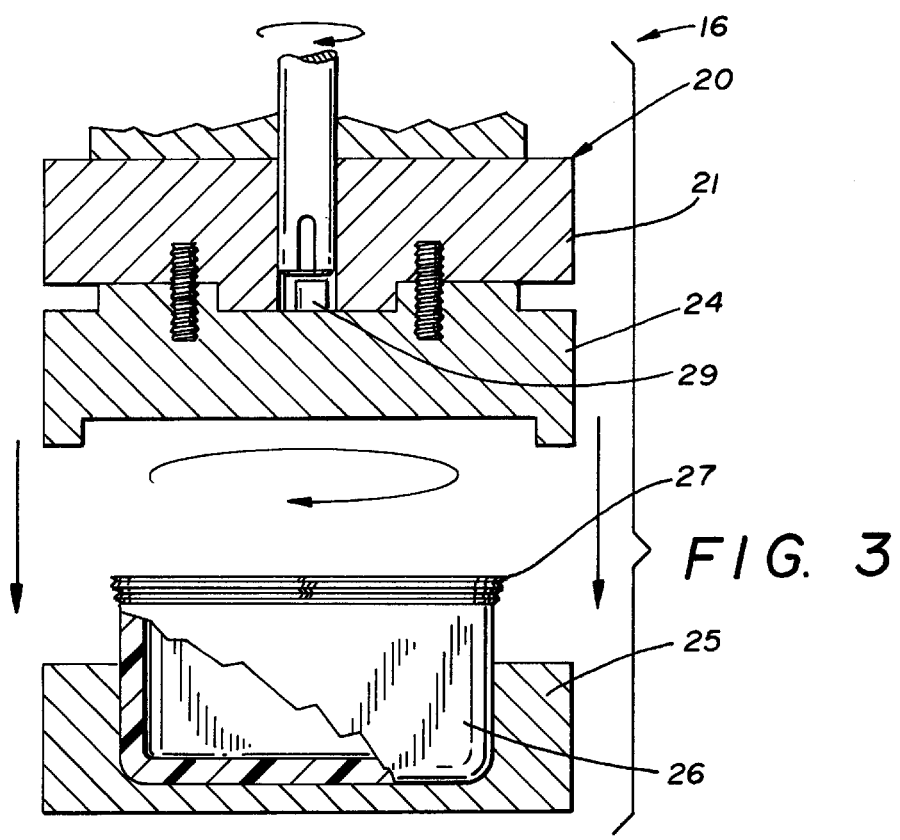
FIG. 3 is an enlarged graphic illustration of a typical mounting and receiving fixture which illustrates parts to be welded within.

Referring to FIGS. 1–3 of the drawings, a welding assembly 10 can be seen having a mounting base 11 and a back plate 12, shown in broken lines. A support carriage 13 is movably positioned on the block plate by multiple linear bearing assemblies 14 on respective bearing races 15. The welding assembly has a power welder 16 secured within the support carriage 13. The power welder 16 has a servo motor 17, connected to a gear reducer 18 by a motor adapter 19. The gear reducer 18 has a spindle assembly 20 with an attached driver 21, best seen in FIGS. 1 and 2 of the drawings which will be discussed in greater detail hereinafter.

The carriage 13 is movable in a vertical plane by a piston and cylinder assembly 22 secured to the back plate 12. A piston rod 23 extends from the piston and cylinder assembly 22 and is secured to the movable carriage assembly as will be well understood by those skilled in the art.

The servo motor 17 is of a three phase electrical servo positioning motor, the type manufactured by Emerson under Model No. DXM6200 having the ability to accelerate from a forced stop position to maximum R.P.M. in a fraction of a second and to de-accelerate to the force stop position just as rapidly. Such servo motors 17 are characterized by their ability to constantly start and spin and stop within six arc seconds of a predetermined position which is critical to the method of the invention and weld characteristics of the thermoplastic parts disclosed herein. The output of the servo motor 17 is connected to the gear reducer 18 by the adapter 19 that mechanically interconnects therebetween. The gear reducer 18 is commercially available at Model ATO14-003 which is a 3 to 1 gear reduction manufactured by Micron Instrument Corporation using multiple planet gears revolving around a single true "sun" gear well known to those skilled in the art.

Referring now to FIG. 3 of the drawings, the driver 21 can be seen having a parts engagement fixture 24 secured thereto. The fixture 24 is simplified for illustration purposes and would be of a custom design for each part configuration to be joined as is typical in the art.

A fixed base part fixture 25 is illustrated with pre-positioned thermoplastic parts 26 and 27 therein to be joined together. The parts 26 and 27 have abutting joining surfaces.

In use, the power welder assembly 10 defines a unique welding method that first positions and holds the thermoplastic parts 26 and 27 together, then applies sufficient pressure to build up substantial energy in the process before the spindle 20 and associated driver 21 and fixture 24 actually turns.

The position of the movable carriages 13 is physically controlled by the piston and cylinder assembly 22 in combination with carriage positioning sensors 28 and input control activation commands from a pre-programmed C.P.U. (Central Processing Unit) interconnected to the power welder assembly 16. Torque is applied to the thermoplastic parts by the output of the servo motor 17 responding to the input control activation commands from the C.P.U. in accordance with its pre-programmed instructions in combination with input from the positioning sensor 29 within the driver 21.

Figure 5:
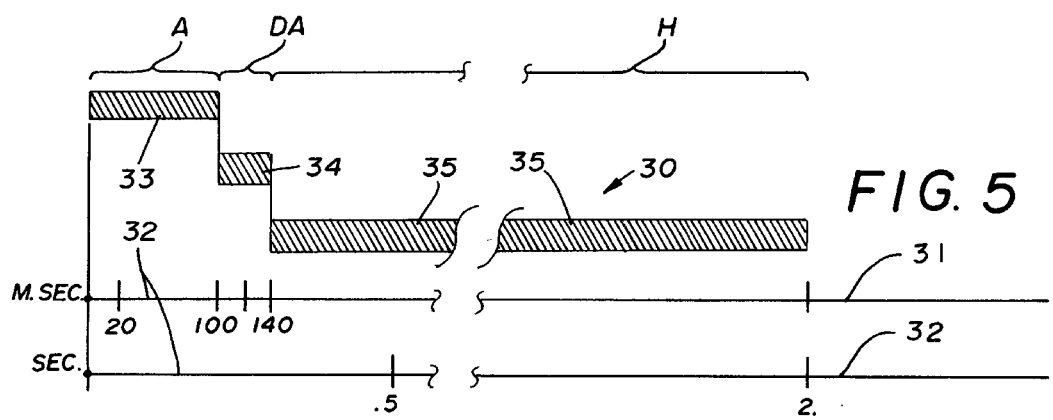
FIG. 5 is a time line graph illustrating welding cycle of the method of the invention.

Referring now to FIG. 5 of the drawings, a time line activation graph 30 is illustrated that indicates a typical activation time for the servo motor 17 to effect a power weld between the thermoplastic parts 26 and 27 as hereinbefore described.

The graph 30 has time lines 31 and 32 in micro-seconds and second respectively with acceleration (A) indicated at 33, and de-acceleration (DA) illustrated at 34 (in milliseconds) and hold time (H) illustrated at 35 (in seconds) before joined parts are released. The critical element of thermoplastic welding is to achieve a weld temperature between the parts as rapidly as possible, illustrated by the acceleration bar 33 and the de-accelerate before the formed weld joint begins to set up (cools) that occurs as the parts de-accelerate illustrated by the de-acceleration bar 34.

The precise controlling of the acceleration and de-acceleration of the motor 17 is achieved by the hereinbefore described ability of the servo motor 17 that is controlled by the pre-programmed C.P.U. with feedback from positioning sensor 29 achieving "stop" position of the driver 21 and fixture 24 in a consistent and repeatable fashion.

The resulting weld between the joined parts is characterized by high consistence with little or no flashing thereabout.

Figure 4:
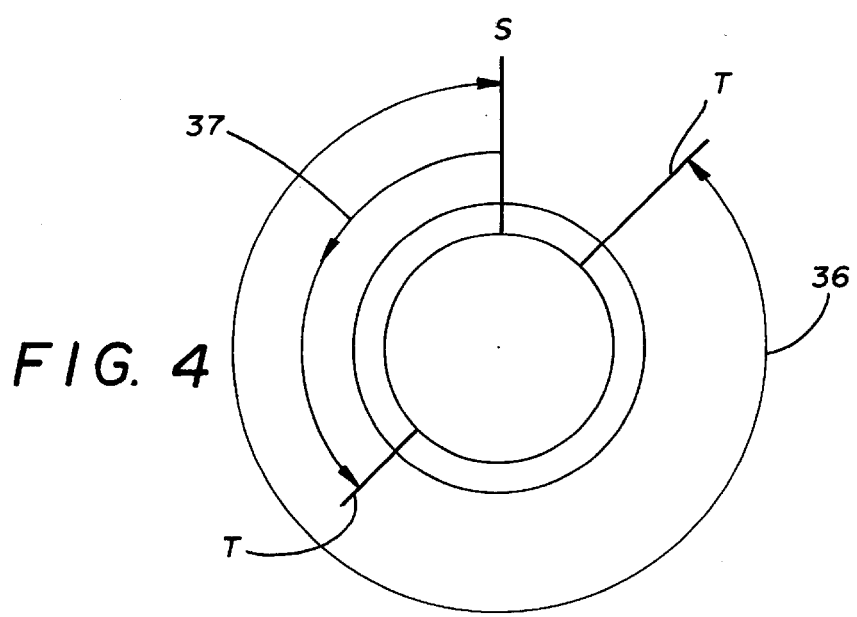
FIG. 4 is a rotational weld orientation graph illustrating rotational distance required to achieve a weld under the method of the invention compared to prior art rotation needed.

Referring now to FIG. 4 of the drawings, a comparison graph of effective rotational duration of prior art spin welding to the method of the invention is illustrated. Graphic arrows 36 illustrate the typical (minimum) rotational revolution required by prior art spin welding that is currently possible at three-quarter of a revolution to achieve welding. The graph arrow 37 illustrates the method of the invention where an efficient superior welding can be achieved in as little as one-third of a rotation. The rotational difference (rotational time RT) of less than half illustrated is demonstrative of other time rotational differences achieved in more than a full rotation in which the method of the invention will always achieve a reduced rotational difference and correspondingly reduced weld time (T) to achieve a superior quality weld, thus duration of weld cycle is reduced and production is increased.

It will be apparent to those skilled in the art that various changes and modifications may be made therein without departing from the spirit of the invention.

Therefore we claim:

1. A method of friction welding of parts comprising; providing parts to be welded, providing a source of rotation for one of said parts, providing a clamping and stabilization means for said parts, providing predetermined pressure on said parts prior to rotation, cycling said source of rotation on and off within milliseconds, providing rotational orientation of said cycle rotation source, and means for cycle and orientation of said source of rotation.

2. The method of friction welding of claim 1 wherein said source of rotation comprises; a servo motor, a gear reduction means in combination with said motor, a spindle and driver driven by said gear means and a source of power.

3. The method of friction welding of claim 1 wherein providing predetermined pressure on said parts comprises; providing a movable support carriage on said source of rotation and means for advancing and retracting said support carriage and said attached rotational source towards and away from said parts.

4. The method of frictional welding of claim 1 wherein said clamping and stabilization means of said parts comprises; providing a fixed parts fixture for receiving said parts.

5. The method of frictional welding of claim 1 wherein providing rotation orientation of said rotation source comprises; providing a pre-programmed C.P.U. input signals from a position sensor within said source of rotation.

6. The method of frictional welding of claim 1 wherein said cycling said source of rotation on and off within milliseconds comprises; providing a pre-programmed C.P.U.

7. The method of frictional welding of claim 3 wherein said means for advancing and retracting said support carriage and said attached rotational source from said parts comprises, providing a piston and cylinder assembly.

8. The method of frictional welding of claim 4 wherein one of said parts in said fixed parts fixture is fixed from rotation, and said remaining part is rotatably engaged by said source of rotation.

\* \* \* \* \*